United States Patent [19]
Bertram et al.

[11] Patent Number: 6,088,030
[45] Date of Patent: Jul. 11, 2000

[54] IMPLICIT LEGEND WITH ICON OVERLAYS

[75] Inventors: Randal Lee Bertram; Frederick Scott Hunter Krauss, both of Raleigh; Margherita LaFauci, Holly Springs, all of N.C.

[73] Assignee: International Business Machines Corporation, Armonk, N.Y.

[21] Appl. No.: 09/063,914

[22] Filed: Apr. 21, 1998

[51] Int. Cl.[7] .................................................. G06F 15/00
[52] U.S. Cl. ........................ 345/349; 345/140; 345/440
[58] Field of Search ................................... 345/140, 133, 345/134, 440, 349

[56] References Cited

U.S. PATENT DOCUMENTS

| | | | |
|---|---|---|---|
| 5,452,410 | 9/1995 | Magidson | 395/140 |
| 5,550,964 | 8/1996 | Davoust | 395/140 |
| 5,566,084 | 10/1996 | Cmar | 364/492 |
| 5,581,677 | 12/1996 | Myers et al. | 395/140 |
| 5,581,678 | 12/1996 | Kahn | 395/140 |
| 5,602,981 | 2/1997 | Hargrove | 395/352 |
| 5,619,631 | 4/1997 | Schott | 395/140 |
| 5,666,477 | 9/1997 | Maeda | 345/440 |
| 5,689,718 | 11/1997 | Sakurai et al. | 395/779 |
| 5,872,909 | 2/1999 | Wilner et al. | 395/183.14 |

OTHER PUBLICATIONS

Quicken User's Guide, Version 7 for DOS: legend with autogeneration of graph symbols.

*Primary Examiner*—Ba Huynh
*Attorney, Agent, or Firm*—Joscelyn G. Cockburn

[57] ABSTRACT

Described is a mapping function and Graphic User Interface (GUI) for use in an interactive computer system. The GUI is generated by a computer program and includes a view of events or objects associated icons and graphical representations of the objects. A different symbol is overlaid on each icon and a common symbol is overlaid on the graph that relates to the object and associated icon. Consequently, mapping is provided between the objects and graph lines and a viewer can easily associate an object with its associated graph.

17 Claims, 11 Drawing Sheets

| ORDERED LIST OF COLORS AVAILABLE | ICONS SELECTED COUNT MODULUS THREE | | ICONS SELECTED COUNT MODULUS TWO | |
| --- | --- | --- | --- | --- |
| 1. BLUE | CIRCLE | 1/3 = 1 | FILLED | 1/2 = 1 |
| 2. RED | TRIANGLE | 2/3 = 2 | UNFILLED | 2/2 = 0 |
| 3. GREEN | SQUARE | 3/3 = 0 | FILLED | 3/2 = 1 |
| 4. CYAN | CIRCLE | 4/3 = 1 | UNFILLED | 4/2 = 0 |
| 5. YELLOW | TRIANGLE | 5/3 = 2 | FILLED | 5/2 = 1 |
| 6. PINK | SQUARE | 6/3 = 0 | UNFILLED | 6/2 = 0 |
| 7. BLACK | CIRCLE | 7/3 = 1 | FILLED | 7/2 = 1 |
| 8. DARK GREEN | TRIANGLE | 8/3 = 2 | UNFILLED | 8/2 = 0 |
| 9. DARK RED | SQUARE | 9/3 = 0 | FILLED | 9/2 = 1 |

FIG. 6

IMPLICIT LEGEND WITH ICON OVERLAYS

BACKGROUND OF THE INVENTION

1. Field of the Invention

The present invention relates to interactive computer controlled display systems, and more particularly, to mapping structures that correlate related information in the display.

2. Prior Art

The use of interactive computer system displays for conveying information to a user is well known in the prior art. In a typical system the user uses a keyboard and/or mouse to select one or more items on the display screen. By manipulating the keyboard and/or the mouse, the user may display additional information about selected items. Examples of prior art interactive computer displays are set forth in the following U.S. patents:

- U.S. Pat. No. 5,689,718: ICONs are used to link additional data.
- U.S. Pat. No. 5,619,631: Direct manipulation of graph changes underlying data.
- U.S. Pat. No. 5,602,981: A dynamically created icon is used to move between views.
- U.S. Pat. No. 5,581,678: Graph type (e.g., pie, bar) is selected automatically.
- U.S. Pat. No. 5,581,677: Symbols within a graph are changed.
- U.S. Pat. No. 5,666,477: Pertains to selecting a style of graph (pie, bar, etc.).
- U.S. Pat. No. 5,566,084: Energy usage data is analyzed and graphed; scenarios are projected.
- U.S. Pat. No. 5,550,964: Different symbols in graph show different analysis on the data.
- U.S. Pat. No. 5,452,410: Algorithm produces a new type of graph.

The prior art patent provide visual displays of information in the fields of spreadsheet, accounting, statistics, etc. Noticeably, there are no displays that would adequately portray information relative to a network of monitored devices. The computer/telecommunication network area is a very important and fast growing area. Therefore, there is a need to provide graphical representations for displaying information in this area.

The effectiveness of any interactive computer system depends on the ease with which the user can manipulate items on the screen and the ease with which the user can visually correlates information on the screen. Even though the above prior art systems seem to work well for their intended purposes, they appear to lack visual correlation between related items in the display. In addition, the prior art displays appear inappropriate for displaying information relating to network management.

SUMMARY OF THE INVENTION

In view of the limitations set forth above, it is an object of the present invention to provide visual representations for a network management system.

Another object of the invention is to provide a mapping methodology for correlating objects, in an ICON view, with related graphs, in a GRAPH view.

The visual representation includes an explicit list of objects with an icon adjacent each object. The icons support the same functions, such as right click, drag, double click, etc., as normal icons. Each selected icon is tagged or overlaid with a unique symbol that is used to draw or trace related graphs in a display of graphs. By using the unique symbol to trace a graph, the user can visually associate the object with its associated graph. The technique is particularly useful where multiple graphs are drawn together to represent multiple objects.

BRIEF DESCRIPTION OF THE DRAWINGS

FIG. 6 shows a table of the scheme for selecting colors, shapes and filled patterns.

DETAILED DESCRIPTION OF THE PREFERRED EMBODIMENT

Figure 2:
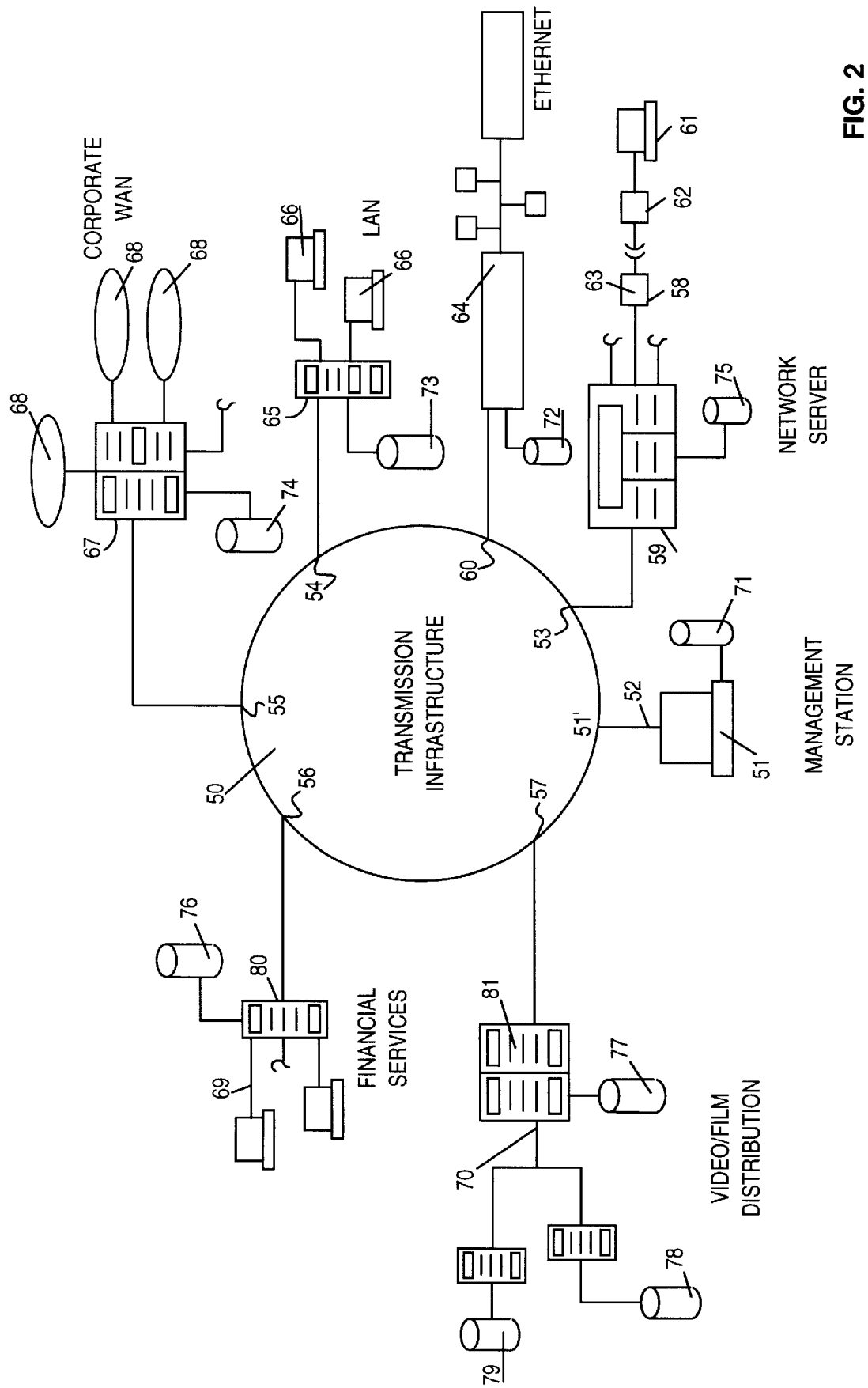
FIG. 2 is a network in which the present invention can be used to display information.

FIG. 2 shows a schematic of a network in which the present invention described below is used. The network includes Transmission Infrastructure 50 interconnected through nodes 51 through 57 to a plurality of network objects. The Transmission Infrastructure may include the Internet, Intranet or similar type networks. A network administrative system, including Terminal 51 and Storage System 71 is connected by connection 52 to node 51'. A User Network 58 is connected through Server 59 to node 53. In such a server network, the individual users' Workstation 61 are connected through telephone modems 62 and 63 to Server 59. The server includes Storage System 75 on which information can be stored. Included in the other illustrated network objects are Ethernet network 64 at node 60 and LAN, including Workstations 66, connected through server 65 to node 54. A Storage Sub-assembly 73 for storing information is coupled to the Server 65. A Corporate Wide Area Network (WAN) including Network Server 67 and Subnetwork 68 is connected to the Transmission Infrastructure at node 55. In addition, functional networks such as Financial Services Network 69 connected via Server 80 and Video/Film Distribution 70, connected via Server 81 respectively at nodes 56 and 57 are typical network objects. It should be noted that a plurality of databases, stored in the Storage Systems 71 through 79, are shown respectively associated with network objects at various levels. These databases represent the various locations and repositories at which parameters and parameter values which may be used to generate the user interface, to be described hereinafter according to the teachings of the present invention, are stored. As a consequence, when the obtaining or fetching of parameter values are subsequently described, it should be understood that they may be obtained from such databases or combination of databases throughout the network using any conventional network method for obtaining data.

Figure 1:
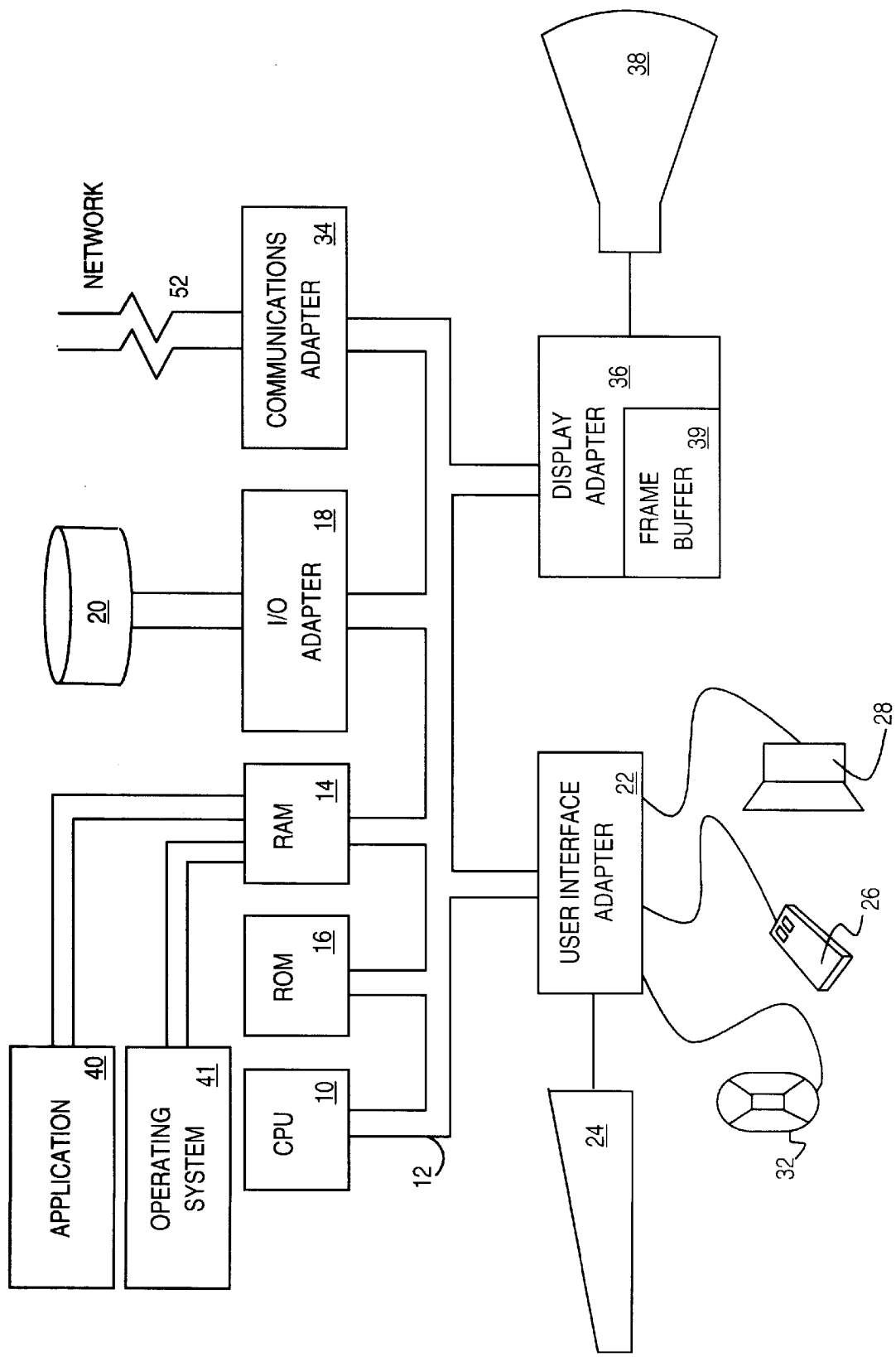
FIG. 1 shows a block diagram of an interactive data processing system including a central processing unit (CPU) programmed in accordance with the present invention to provide the display shown in FIGS. 3, 4 and 11.

FIG. 1 shows a functional block diagram of the management station on which the graphic interface, according to the teachings of the present invention, is generated and displayed. The management station includes Central Processing Unit (CPU) 10, such as one of the PowerPC microprocessors available from International Business Machines Corporation (PowerPC is a trademark of International Business Machines Corporation) is provided and interconnected to various other components by System Bus 12. An Operating System 41 is executed by CPU 10 and provides control and is used to coordinate the function of the various components of FIG. 1. The Operating System 41 may be one of the commercially available operating systems such as DOS, OS/2 operating system available from International Business Machines Corporation (OS/2 is a trademark of International Business Machines Corporation), or any other multi-tasking operating system. A programming system monitoring management Application 40, details to be given hereinafter, runs in conjunction with Operating System 41 and provides output call to the Operating System 41 which implements various functions to be performed in accordance with the Application 40.

A Read Only Memory (ROM) 16 is connected to CPU 10 via System Bus 12 and includes the Basic Input/Output System (BIOS) that controls the basic computer functions. Random Access Memory (RAM) 14, I/O Adapter 18 and Communications Adapter 34 are also interconnected to System Bus 12. The Communications Adapter is connected to the network by connection 52. Even though the Application Program 40 and Operating System 41 are shown in the figure as being separate entities, this should be construed as an exemplary showing. In actuality, the Operating System 41 and Application 40 are loaded in RAM 14. The microprogram which controls the operation of the CPU is stored in ROM 16. I/O Adapter 18 may be a Small Computer System Interface (SCSI) adapter that communicates with the Disk Storage Device 20; i.e., a hard drive or similar storage mechanism. Communications Adapter 34 interconnects Bus 12 with an outside network, enabling the data processing system to communicate with other such systems over a Local Area Network (LAN), Wide Area Network (WAN), which includes, of course, the Internet, Intranet or similar type transmission infrastructure. I/O devices are also connected to System Bus 12 via User Interface Adapter 22 and Display Adapter 36. Keyboard 24, Trackball 32, Mouse 26 and Speaker 28 are all interconnected to Bus 12 through User Interface Adapter 22. It is through such input devices that the user interactive functions involved in the display of the present invention (to be described below) may be implemented. Display Adapter 36 includes a Frame Buffer 39 which is a storage device that holds a representation of each pixel on the Display Screen 38. Images may be stored in Frame Buffer 39 for display on Monitor 38 through various conventional components such as a digital-to-analog converter (not shown) or the like. These conventional structures are so well-known in the art that further discussion is not warranted. By using the aforementioned I/O devices, a user is capable of inputting information into the system through the Keyboard 24, Trackball 32 or Mouse 26 and receive output information from the system via Speaker 28 and Display 38. In the preferred embodiment, which will be described hereinafter, the mouse will be the primary input device by which the user; i.e., network administrator or the like, will interface with the system.

The invention described herein may be used with any process in which a parameter of the process is to be monitored and displayed. It works well in a communications network, and as such, will be described in that environment. However, this should not be construed as a limitation on the scope of the present invention since it is well within the skill of one skilled in the art to make minor changes to the invention and adapt it for use in said process.

With respect to a communication system such as the one described in FIG. 2, the invention to be described herein is provided on the display screen of Management Station 51. The database which is manipulated to provide the graphical user interface (GUI) of the present invention is stored on Memory Device 71. The information which is stored on Memory Device 71 is gathered from devices in the network referred to as objects. The object could be any one of the Servers 59, 65, 67, 69, 81 or any other device in the communication system. The information is gathered in the object and is transported over the network to Management Station 51. The gathering of information and presenting it in a management station is well-known in the art and a detailed description of the gathering technique will not be given herein. An alternative way of gathering the information in the database on Storage Device 71 would be for the information to be stored on any of the local storage devices from which a tape or other portable storage of information is built and provided at the Management Station 51.

Figure 3:
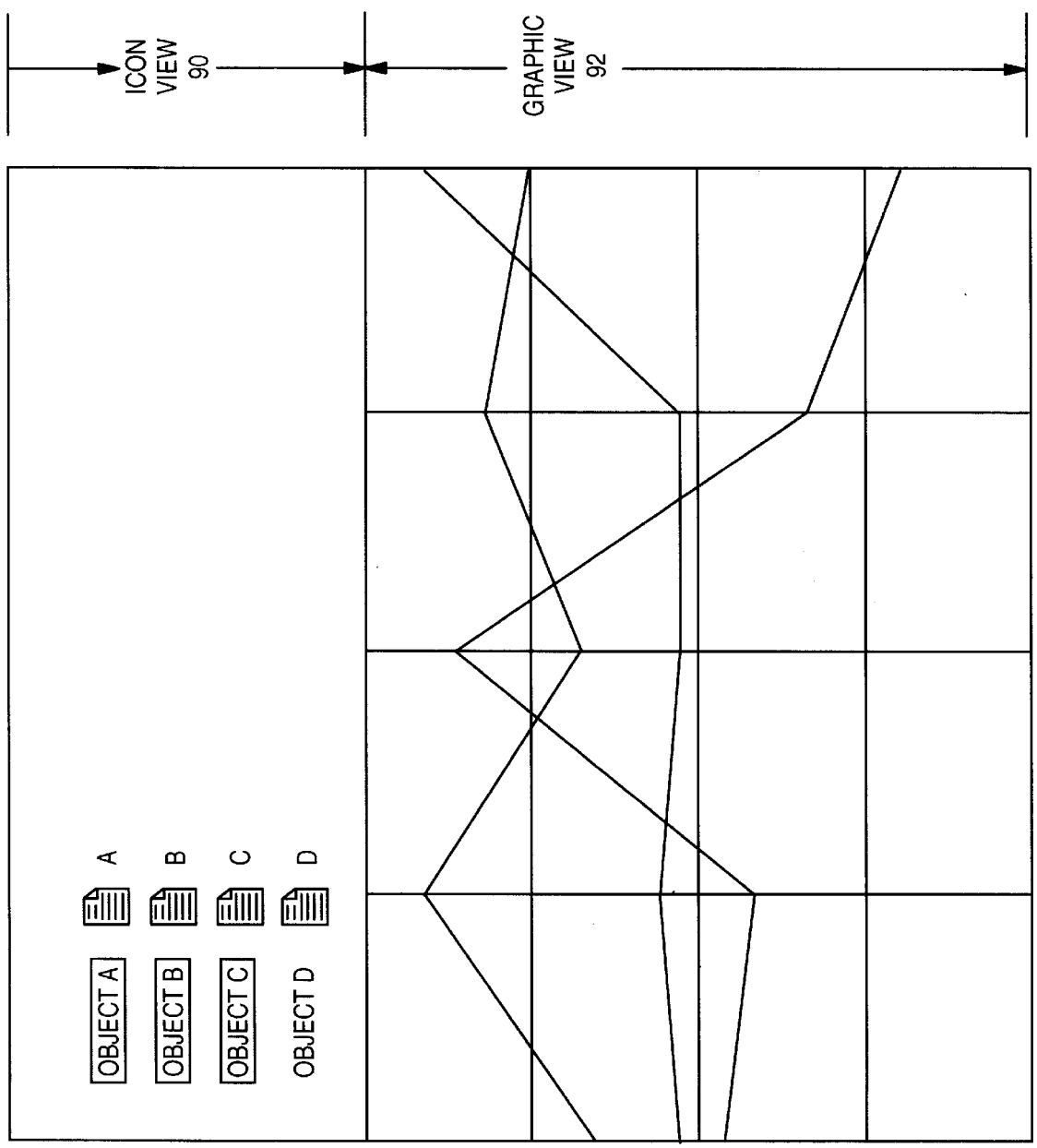
FIG. 3 shows a display that is void of the mapping function.

Referring now to FIG. 3, a graphical user interface (GUI) according to the teachings of the present invention is shown. The GUI includes an ICON View 90 and a Graphic View 92. The ICON View includes a table with a plurality of entries A, B, C, D and so forth. Each of the entries includes an object and associated icon. For example, entry 1 of the table includes object A and the associated icon. Likewise, the second entry includes object B and the associated icon and so forth. Each of the objects represents visual information about an underlying device that is being monitored. For example, with reference to FIG. 2, object A could be the server or any other device in the network. Likewise, object B could be another server, and so forth. The Graphic View 92 includes a plurality of line graphs which are drawn to represent the underlying parameter that is being monitored and displayed. For example, the line graphs could represent CPU utilization in any of the servers identified as objects A, B or C. The user can perform any of the following icon functions: right click, drag, double click, etc. As an object is selected, a line graph is drawn in the Graphic View 92 to represent the parameter associated with that object. As discussed above, the data that is used for drafting the line graph would be on the Storage Device 71 of the management station (FIG. 1). Even though the GUI, FIG. 3, is effective in presenting a visual image of network parameters, when more than one object is selected, it is impossible for a user to match the line graph in the Graphic View 92 with the object it represents in the ICON View 90. In FIG. 3, objects A, B and C are selected but one cannot tell which line in the Graphic View goes with each object. To make this mapping easier for the user, a mapping function is provided and is discussed hereinafter.

Figure 4:
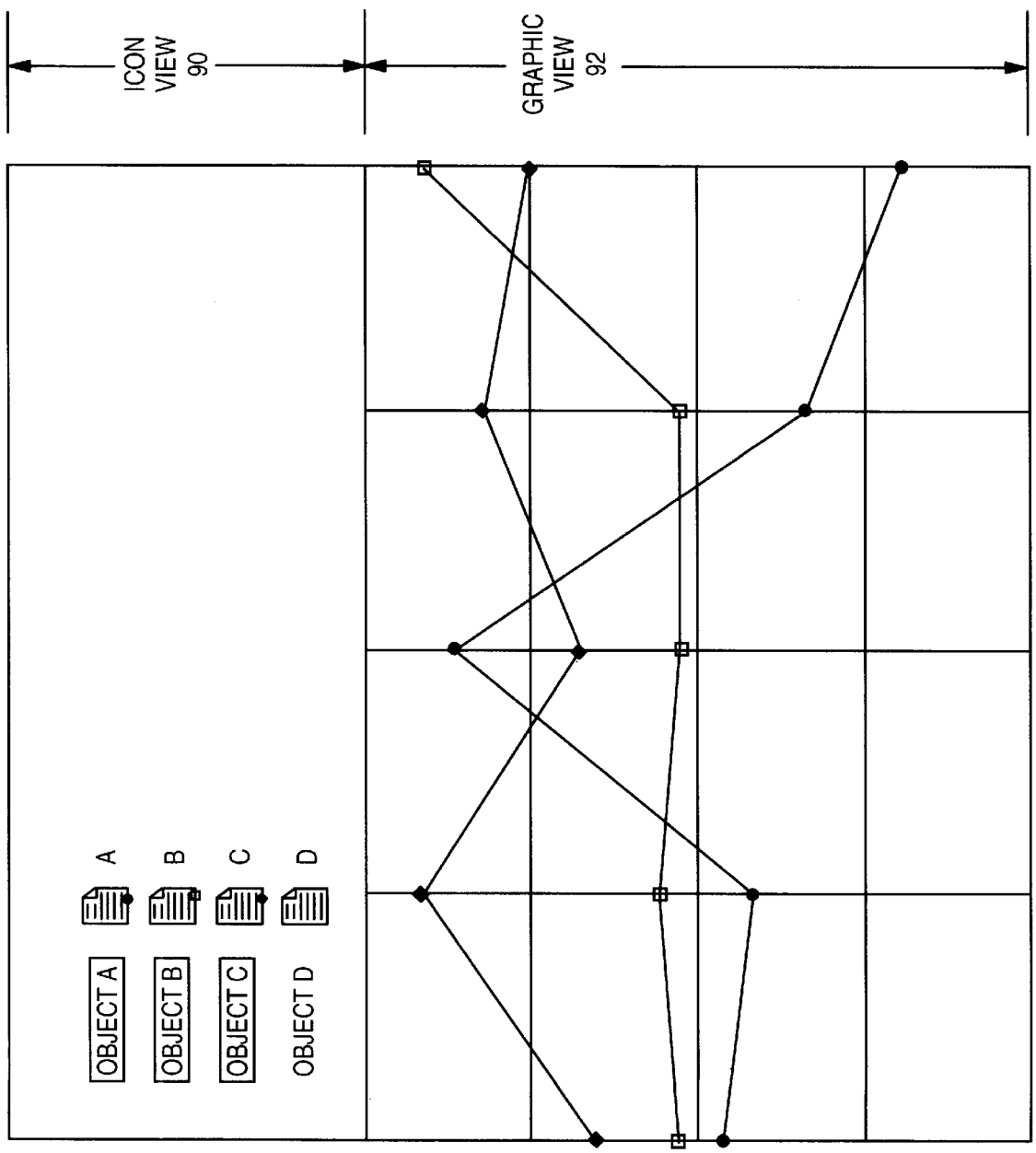
FIG. 4 shows a display with the mapping function.

FIG. 4 shows a Graphic User Interface with the mapping function implemented therein. The mapping function overlays different geometrical patterns or symbols on the icons and uses the geometrical pattern laid on a particular icon to draw the graph that is associated with that particular icon.

In order to correlate the drawing in FIG. 4 with that in FIG. 3, common numerals are used to identify like elements or features. To this end, FIG. 4 includes ICON View 90 and Graphic View 92. The ICON View 90 includes a table with entries A, B, C and D. Each entry is made up of an object and an icon. Likewise, Graphic View 92 includes a plurality of line graphs. It should be noted that other types of graphs could be used in the Graphic View 92 without departing from the teachings or spirit of the present invention. The mapping function, according to the teachings of the present invention, generates and tags each icon with a different symbol. In FIG. 4, object A icon is tagged with a solid circle, object B is tagged with a hollow square, and object C is tagged with a solid triangle. Of course, other shapes and forms could be used without departing from the spirit and scope of the present invention.

To associate the line graph in the Graphic View 92 of the GUI with the object in the ICON View 90, the same symbol is overlaid on the line graph that represents the underlying parameter that is being monitored. In other words, in the icon view, different symbols are used to tag or overlay each icon. The same symbols are used in the graphic view to generate the line graph. It can be seen from the figure that correlating an object with the graph representing it is easier on the viewer since both the object and the graph are identified by a common symbol.

Still referring to FIG. 4, it can be seen that a sequence of unique symbols are used to overlay the icons in the ICON View 90. The sequence of overlays may include a plurality of shapes, patterns and colors. In the preferred embodiment of this invention, three shapes (circle, triangle and square) are used. In addition, two filled patterns (solid and hollow) are used. To further distinguish the graphs and associated icons, different colors can be assigned to the shapes. Included in the color assigned to the shape are blue, red, green, cyan, yellow, pink, black, dark green and dark red.

Even though line graphs are used in the graphic views, this should not be construed as a limitation on the invention. The invention is also applicable to non-line graphs, such as pie, bar charts, etc.

In operation, when a user uses the mouse of the management station or some other pointing mechanism to select an object, a symbol is overlaid (i.e. drawn) on the object icon. Preferably, the symbol contains a color, a fill pattern, and a shape (e.g., blue solid circle). The line graph is then drawn in the Graphic View 92 and it contains data point symbols that correspond exactly to the icon overlay for the selected object. This establishes a mapping between the selected objects and their corresponding line graphs in the Graphic View 92. The unique icons are created dynamically as a new graph line is drawn. Line styles such as dashed or solid can also be used to distinguish graph lines drawn. These line styles may be used in the icon overlay. This solution provides an implicit legend of graph lines for the user which is an alternative of explicitly listing the object names and the corresponding line in a table as in FIG. 11. By eliminating an explicit legend, screen space is saved which allows the graph to be larger and more readable. The implicit legend is also scrollable on the screen when the list is larger than one page. The user does not have to guess at what graph lines corresponds to which object since the symbol on the graph matches the one associated with the object.

An explicit legend is used when printing the graph. This will allow the user to identify the objects and the corresponding graph lines when only the graph is printed. Printing in black and white is not a problem since color alone is not the only attribute that distinguishes the object and line graph. The user does not have to guess at which line graph corresponds to which object, because the explicit legend is always printed with the graph.

Figure 5:
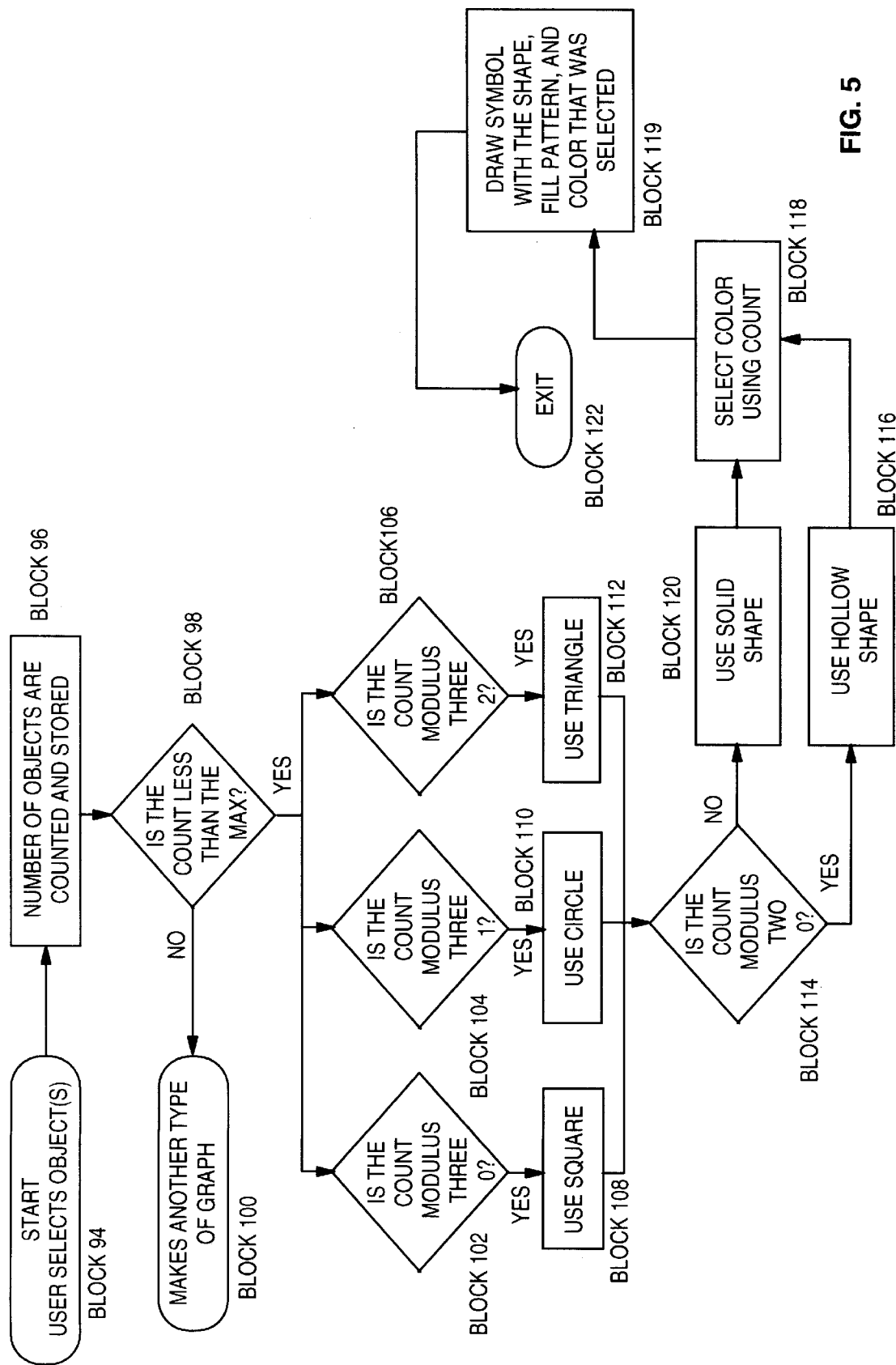
FIG. 5 is a flowchart of the program process for generating the display in FIG. 4.

FIG. 5 shows a flowchart of the algorithm used to determine the series of overlays shown in FIG. 4. The algorithm is based upon the number of objects chosen by a user. A fixed number of objects can be selected and graphed at one time. A count of the objects selected is captured and used to create the overlays. Referring now to FIG. 5, the algorithm begins in block 94 where the user selects the number of objects. The algorithm then enters block 96 where the number of objects selected are counted and stored. The algorithm then descends into block 98 where the algorithm checks to see if the count selected is less than the maximum count. If the count is not less than the maximum permitted by the user, the program enters block 100 where it is suggested that the user use another type of graph to display the parameter that is being monitored. By an empirical process, it was determined that for a line graph, the maximum number should be no greater than 9, preferably 6 gives a more readable type of graph. If the number of objects selected is less than the maximum (block 98), the algorithm descends into blocks 102, 104 and 106. The algorithm figures the count modulus three. The modulus is the remainder of the count divided by three. The number three is used because there are three possible shapes (square, circle, and triangle) to choose from. Therefore, the remainder can only be: 0 square, 1 circle, or 2 triangle. In block 102, the algorithm checks that the modulus is zero. If the answer is yes, the algorithm descends into block 108 where a square is used as a symbol for marking the icon. Likewise, in block 104, the algorithm checks that the modulus is one. If it is, the program descends into block 110 and a circle is used as a symbol for marking the icon. Finally, in block 106, the algorithm tests that the modulus is two. If it is, the program descends into block 112 and a triangle is used as a tagging symbol. From block 108, block 110 and block 112, the algorithm descends into block 114 where it tests the count modulus two. If the modulus is zero, the algorithm descends into block 116 where a hollow shape is used as the selected symbol. The program then enters block 118. An ordered list of nine colors: 1 blue, 2 red, 3 green, 4 cyan, 5 yellow, 6 pink, 7 black, 8 dark green, and 9 dark red is used along with the stored count to select a color. The stored count correlates to the number associated with a given color. For example, the first selected object is assigned the first color, the second object selected is assigned the second color, etc.

Referring again to block 114, if the modulus is one, the algorithm enters block 120 and uses a solid shape as the tagging symbol. The algorithm then enters block 118. From block 118, the algorithm enters block 119 where it draws the icon symbol with the shape, fill pattern, and color that were selected. The algorithm exits in block 122.

FIG. 6 is a table showing details of the scheme for choosing the colors, shapes, and fill patterns of the overlays. Viewing the table from left to right, the first column relates to colors, the second column relates to shapes and the third column relates to filled patterns. Although this is not the only scheme, the number and type of colors, shapes and fill patterns can be different. This table shows the output of FIG. 5.

Both the icon view and the graphic view use the algorithm in FIG. 5 to determine symbols for the objects. The graphic view uses FIG. 5, or a similar algorithm to assign symbols to objects and then it creates a legend.

Figure 7:
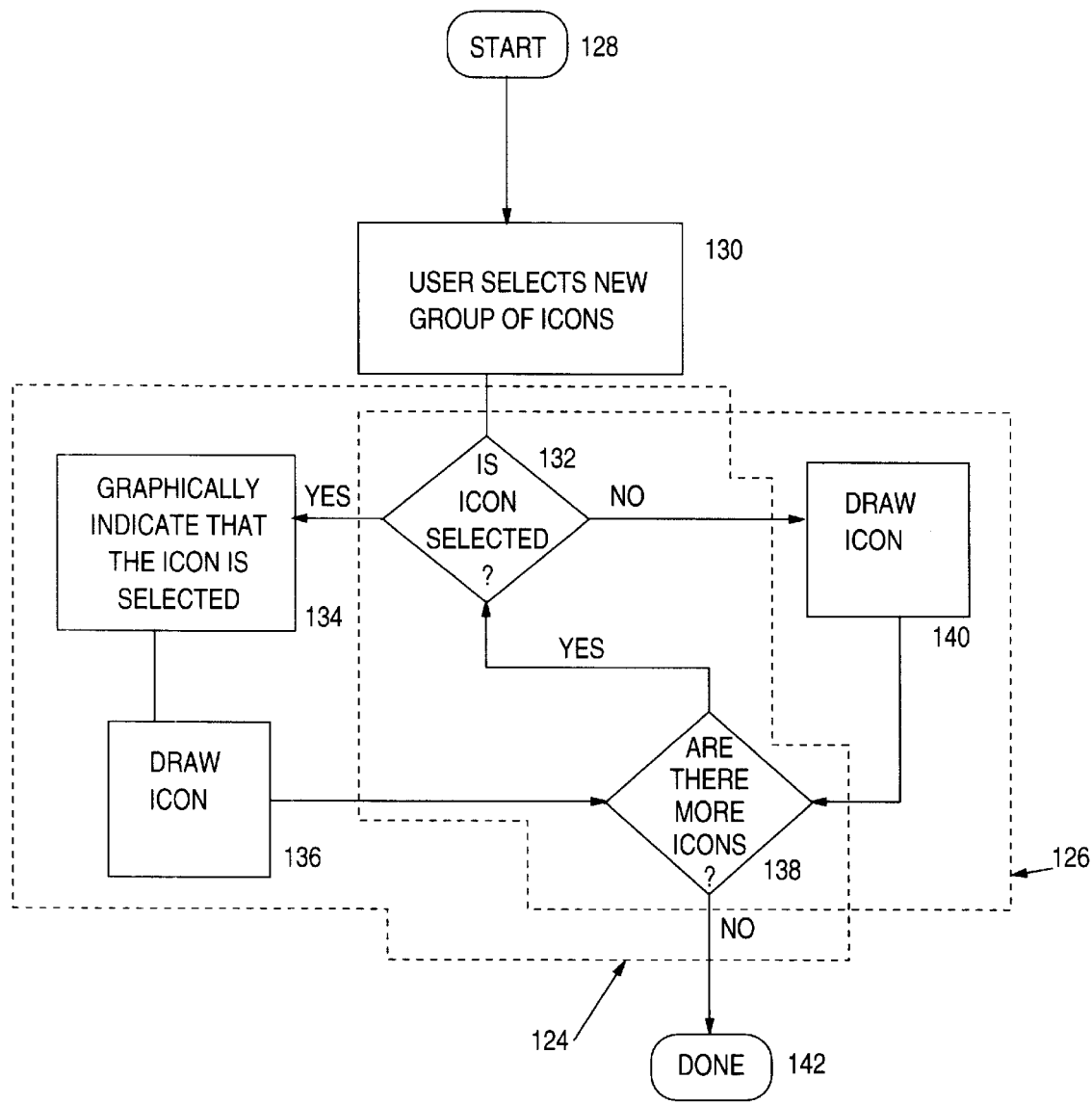
FIG. 7 shows the flow chart of the algorithm that generates the ICON view in FIG. 3.

FIG. 7 is a flow chart for the algorithm used to prepare the icon view in FIG. 3. Essentially the algorithm has two loops identified by numerals 124 and 126. The loop identified by numeral 124 selects the icon and graphically indicates that it is selected. With respect to FIG. 3, the graphical indication is the enclosing of selected objects with rectangular blocks. The loop identified by numeral 126 (hereafter loop 126) draws the icon where an object is not selected. With reference to FIG. 3, D is the result of loop 126.

Still referring to FIG. 7, in more detail, the algorithm starts in block 128 and descends into block 130 whereat the user selects a new group of icons. The algorithm then descends into block 132 whereat the loop 124 or loop 126 is traversed. If loop 124 is traversed, the algorithm exists block 132 to block 134 whereat a rectangle (of course, other shapes could be used) is drawn about the selected objects. The algorithm descends into block 136 whereat the icon is drawn. The algorithm enters block 138. If additional icons are to be drawn, the algorithm repeats the loop; otherwise, the algorithm exits through block 142. If loop 126 is traversed, the algorithm draws the icon and repeats the loop or exits.

As is evident from the above description, this invention provides an implicit legend of graph lines for the user to use in associating line graphs with an object. Even though the invention allows color to be used with the tagging symbol, color is only one attribute of the invention and someone who is color deficient can still make the association based upon the different shapes that are used for identifying each of the icons and the common shape that is used to identify an icon with its corresponding graph. This solution is usable even in a black and white graphic system. The unique combination of fill pattern and shape used to establish a mapping or coding between objects and their graph lines permit users to effectively use this tool even if they are color deficient. This is so because the distinction is based not only on color but also on shapes and fill patterns.

Figure 8:
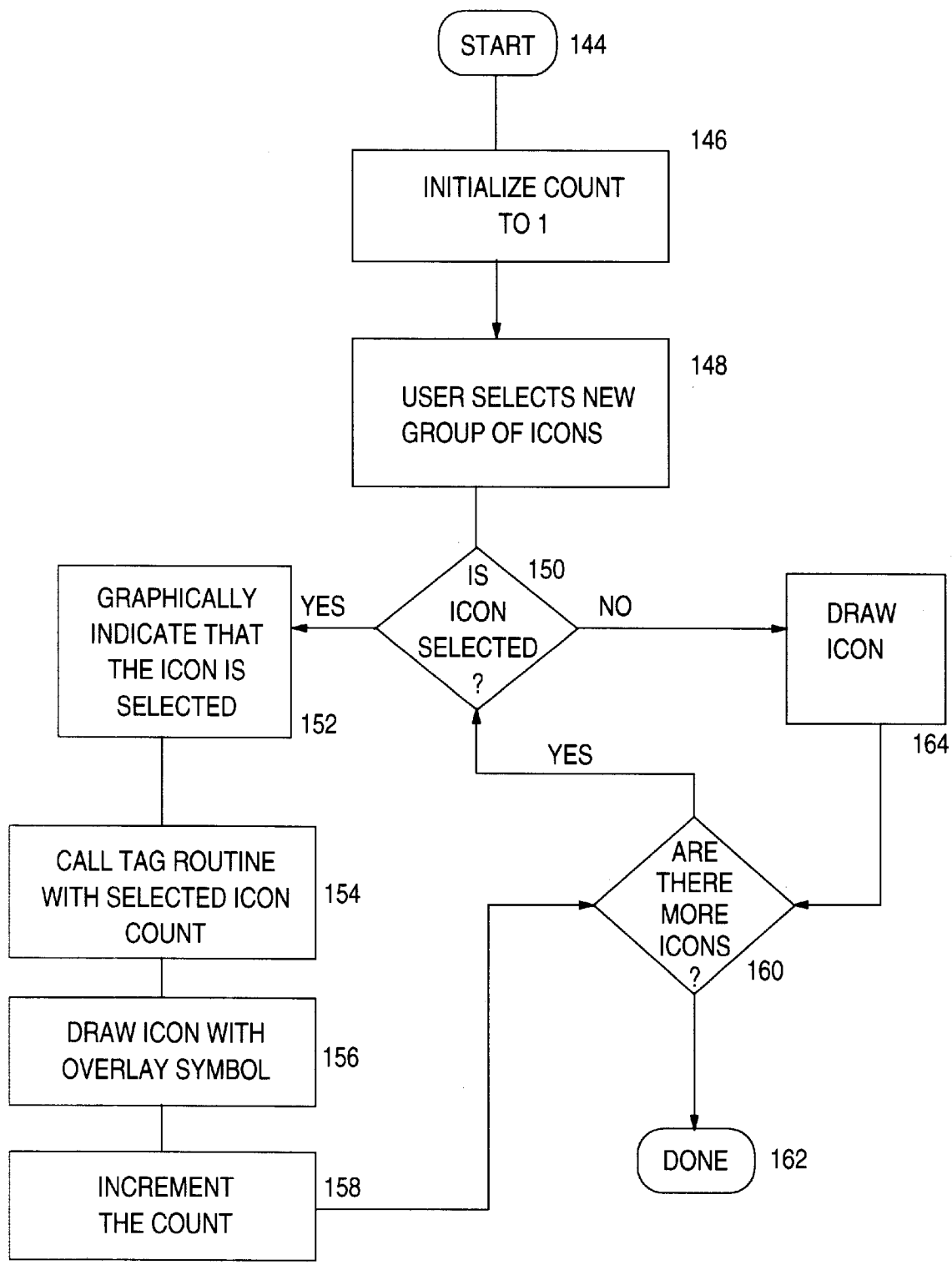
FIG. 8 shows the flow chart of the algorithm for generating the ICON view in FIG. 4.

FIG. 8 shows a flow chart of the algorithm used to generate the icon view in FIG. 4. The algorithm starts in block 144 and descends into block 146 whereat an initialize count is set to 1. The algorithm then descends into block 148 whereat the user selects a new group of icons. The algorithm then descends into block 150 whereat a decision is made to select or not select the icon. If the icon is selected, the algorithm exits from block 150 into block 152 whereat a graphical indication is generated to indicate that the icon is selected. The algorithm then descends into block 154 whereat the call tag routine (FIG. 5) is executed with the selected icon count. The algorithm then descends into block 156. In block 156 the icon is drawn with the overlay symbol. The algorithm then descends into block 158 whereat the count is incremented and the algorithm enters block 160. If there are more icons to process, the algorithm exits block 160 along the yes path and repeats the loop; otherwise, the algorithm exits through block 162.

If an icon is not selected (block 150), the algorithm exits block 150 into block 164 where the icon is drawn. The algorithm then descends into block 160 whereat it exits block 160 along the yes path or exits through block 162.

Figure 9:
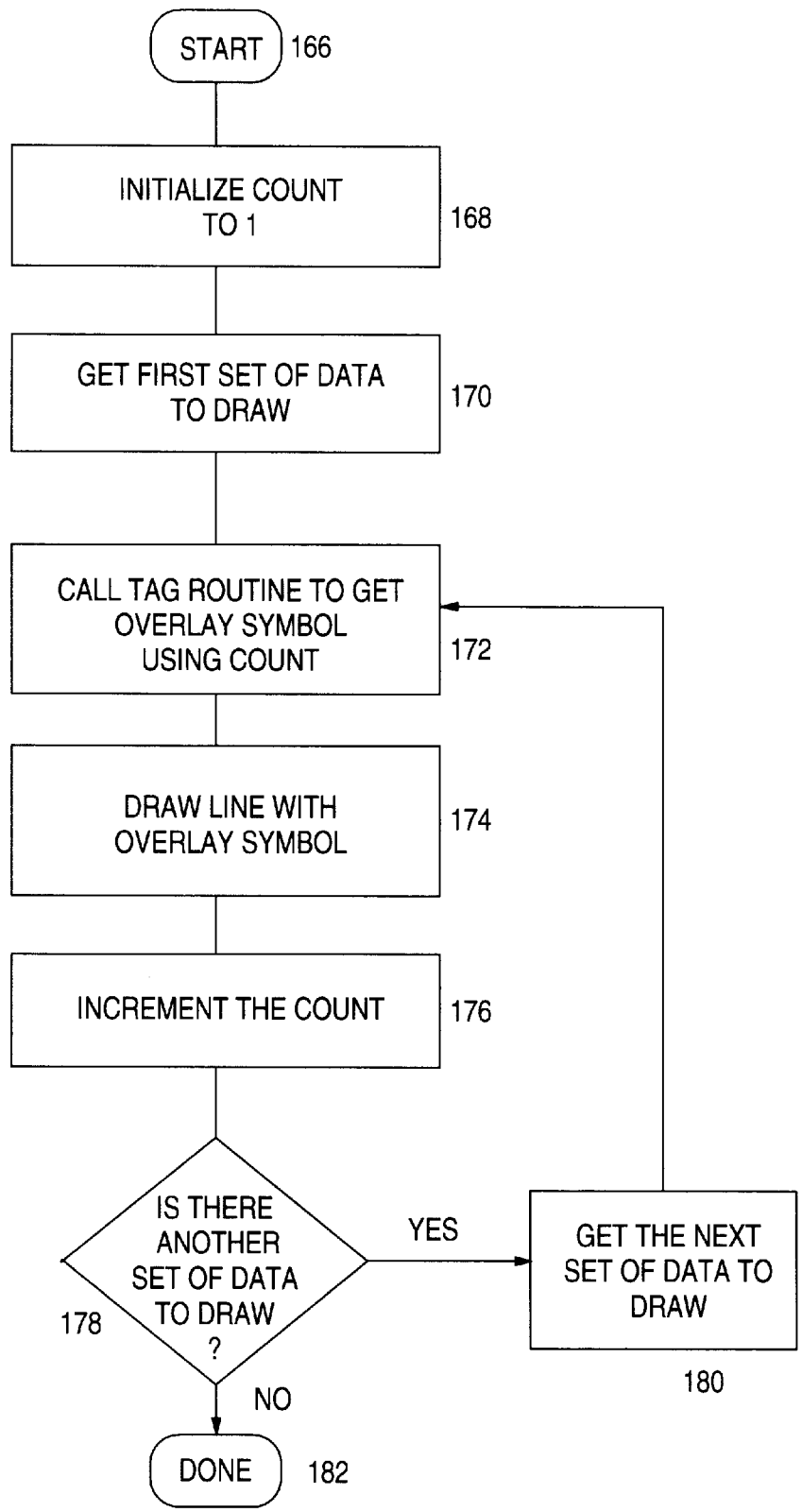
FIG. 9 shows the flow chart of the algorithm for generating the GRAPHIC view.

FIG. 9 shows a flow chart of an algorithm for generating the graphic view. The algorithm starts in block 166 and descends into block 168 whereat a count is initialized to 1. The algorithm then descends into block 170 whereat the first set of data to be drawn is obtained. The algorithm then descends into block 172 whereat the tag routine (FIG. 5) is called. The algorithm then descends into block 174 whereat the line with overlayed symbols is drawn. The algorithm then descends into block 176 where the count is incremented and the algorithm descends into block 178. In block 178 the algorithm decides if another set of data is to be drawn. If the answer is yes, the algorithm enters block 180 whereat the next set of data to be drawn is obtained and the loop comprising of blocks 172, 174, 176 and 178 is repeated until the data is completed whereat the algorithm exits through block 182.

Figure 10:
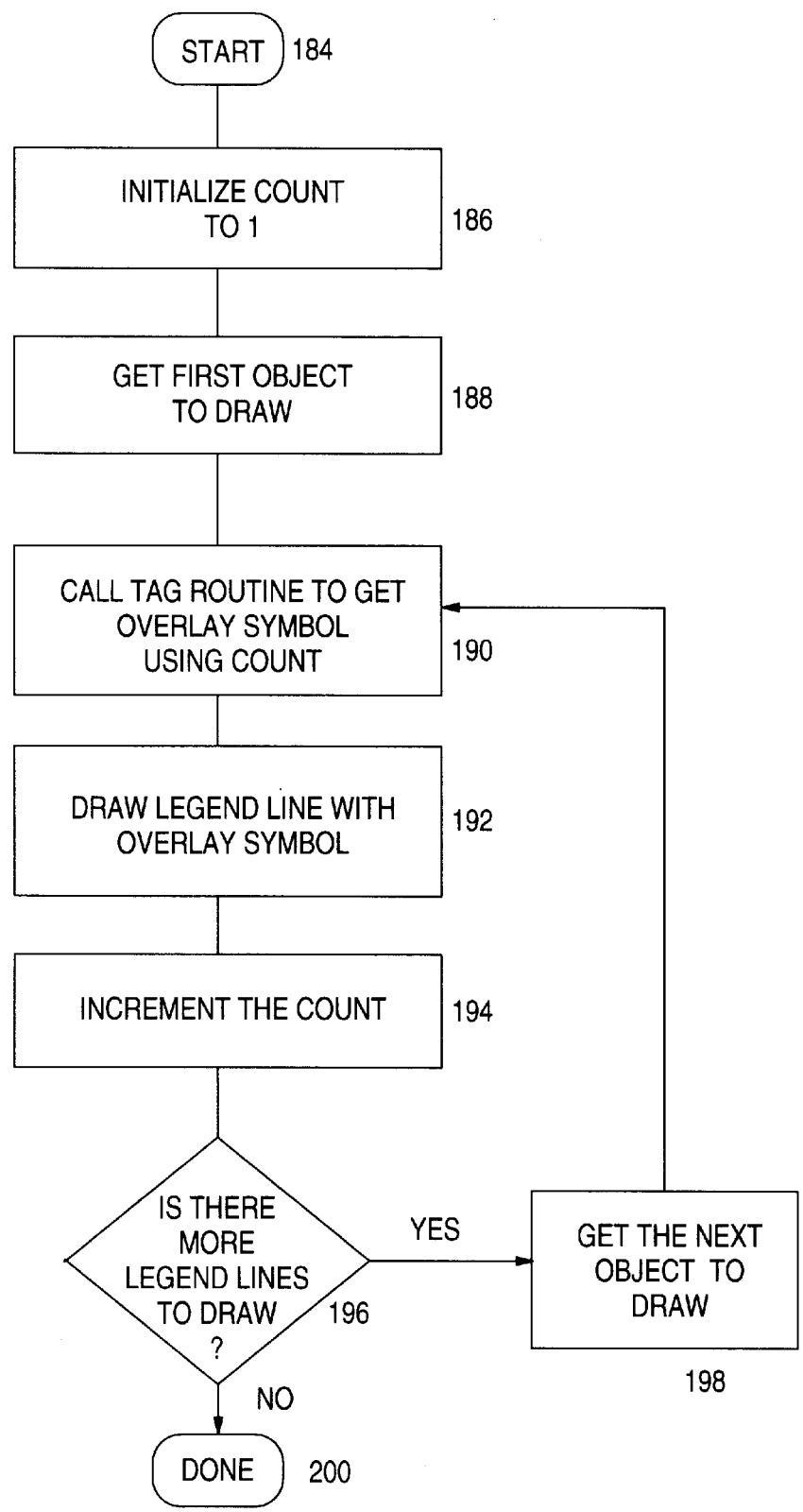
FIG. 10 shows the flow chart of the algorithm for generating the LEGEND view.
Figure 11:
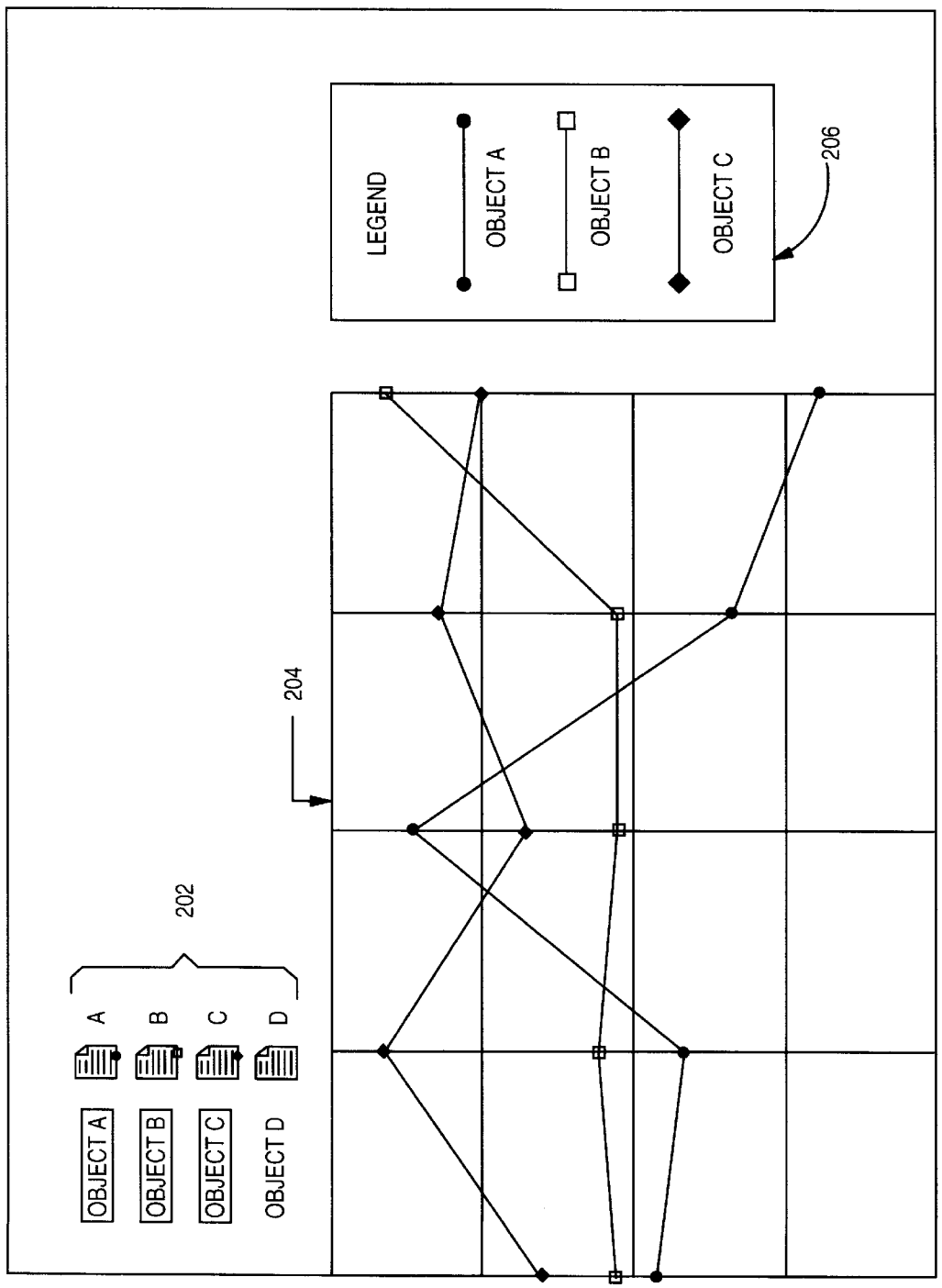
FIG. 11 shows a display of the ICON, GRAPH and LEGEND views.

FIG. 10 shows the flow chart of an algorithm for a graphic view in which legends are used to identify the graphs (FIG. 11). The algorithm starts in block 184 and descends into block 186 whereat a count is initialized to 1. The algorithm then descends into block 188 whereat the first object to be drawn is obtained. The algorithm then descends into block 190 whereat the tag routine (FIG. 5) is called. The algorithm then descends into block 192 whereat the legend line is drawn with overlay symbols. The algorithm then descends into block 194 where the count is incremented and the algorithm descends into block 196. If there are more legend lines to be drawn, the algorithm exits from block 196 to block 198 where the objects to be drawn are fetched and the loop comprising of blocks 190, 192, and 194 is repeated until there are no more lines to be drawn and the algorithm exits through block 200.

Referring to FIG. 11, a display of ICON view 202, graphic view 204 and legend view 206 is shown. The ICON view and the graphic view and further description have been described above and further description is not warranted. The legend view is provided with insignia that allows a viewer to associate the insignia with the related graph.

Several benefits inure to the user of the present invention. For example, an implicit legend that represents both the graph lines and an object is easy to recognize and can be scrolled with ease. It will take a user much less time to understand the relationship between the object and the graph line. It also saves space on the screen so a larger graph can be created because an explicit legend, as in FIG. 11, is not necessary. In addition, the implicit legend can use color as an attribute but does not use it exclusively to distinguish a correlation between objects and graph lines. Color alone is not used exclusively as an attribute so printing in black and white or using a monochrome monitor is not a problem.

While the invention has been particularly shown and described with reference to a preferred embodiment thereof, it will be understood by those skilled in the art that various changes and form and details may be made therein without departing from the spirit and scope of the invention.

Having thus described our invention, what we claim as new and desired to secure by Letters Patent is:

1. A computer controlled interactive display system for displaying at least one parameter associated with a process including:

means for sensing values representing the at least one parameter;

memory for storing data representing said values;

a graphic user interface (GUI) disposed on the display, said graphic user interface including a list of objects and associated icons wherein each object and associated icon are being related to a set of the data;

means for overlaying at least one symbol on at least one of the associated icons;

a user interactive device for selecting icons; and means responsive to at least one of the associated icons selected with the interactive device for generating at least one graph wherein the symbol overlaid on the icon is used to draw the graph.

2. The interactive display system of claim 1 wherein the user interactive device includes a mouse.

3. The interactive display system of claims 1 or 2 wherein the at least one symbol includes a geometric shape.

4. The interactive display system of claim 3 wherein the geometric shape includes circle, triangle or square.

5. The interactive display system of claim 4 wherein the shape has different fill pattern including solid or hollow.

6. The interactive display system of claim 3 wherein the shape is color coded.

7. The interactive display system of claim 6 wherein the color includes blue, red, green, cyan, yellow, pink, black, dark green and dark red.

8. A computer implemented user interactive method for monitoring and displaying at least one parameter of a process comprising the steps of:

providing a data base containing data representing said one parameter;

generating, on a display, a graphic user interface including a plurality of objects and a plurality of icons wherein each icon relates to a set of the data and is paired with one object;

overlaying each icon with a different symbol;

providing an interactive device;

interactively using said interactive device to select icons; and as each icon is selected, generating a visual image with points on the visual image being identified with symbols identical to the symbol overlaid on the selected icon.

9. The method of claim 8 wherein the visual image includes graphs.

10. In a computer managed communications network with user interactive access via at least one display terminal and including a plurality of linked network objects, a method for displaying information on said network comprising the steps of:

sensing values of a selected parameter for each of a plurality of objects in the network;

storing data representing said values;

graphically presenting said stored data on said at least one display including identity of each object and a corresponding icon, wherein said object and the corresponding icon represent the selected parameter;

overlaying each icon with a different symbol;

operatively selecting icons, with an interactive device; and generating on said at least one display, a set of graphs with each graph being generated as a result of selecting an icon and each graph is overlaid with the symbol on the icon that causes the generation of the graph.

11. An article of manufacture for use in an interactive computer display system comprising:

a recording medium carrying at least one computer program that interacts with said computer to generate a Graphic User Interface wherein said at least one computer program includes a first module including a first set of binary bits for generating a table containing objects and associated icons; second module, including a second set of binary bits that cause a graph to be generated in response to selecting an icon; and third module including a third set of binary bits, for generating and overlaying different symbols on different icons and common symbols on an icon and related graph.

12. The method of claim 9 wherein the graphs include line graphs.

13. The method of claim 8 wherein each object and corresponding icon relates to a data set in the data base.

14. The method of claim 13 wherein the data set relate to monitored devices in a communications network.

15. A system comprising:

a computer having a processing unit, system memory, a user manipulation device and a video display;

a plurality of data sets loaded in the system memory;

programmed instructions operatively loaded in said computer; said programmed instructions containing a first set of instructions that causes at least one object and an associated icon that relates to a least one of the data set to be displayed on the video display;

a second set of instructions that cause at least one symbol to be overlaid on the icon;

a third set of instructions that cause a graph to be drawn on the video display when the manipulation device is clicked on the icon wherein the symbol is placed at selected points of the graph.

16. The system of claim 15 further including a network of interconnected devices operatively coupled to the computer and the data sets are collected from the interconnected devices.

17. A computer generated method comprising:

using a software program to generate a Graphical User Interface (GUI) on a video display, said GUI having at least one object and an icon associated with the object;

generating and overlaying, with a software program, at least one symbol on the icon;

providing a pointer within the display areas of the video display and a manipulation device for maneuvering the pointer;

clicking the pointer on the icon; and as an icon is clicked, using software program to generate a graph on said video display with the symbol on the icon marking selected points on the graph.

* * * * *